May 9, 1933.                P. I. HOLLMAN                1,908,668
                              OVEN BURNER
                          Filed Jan. 21, 1931          2 Sheets-Sheet 1
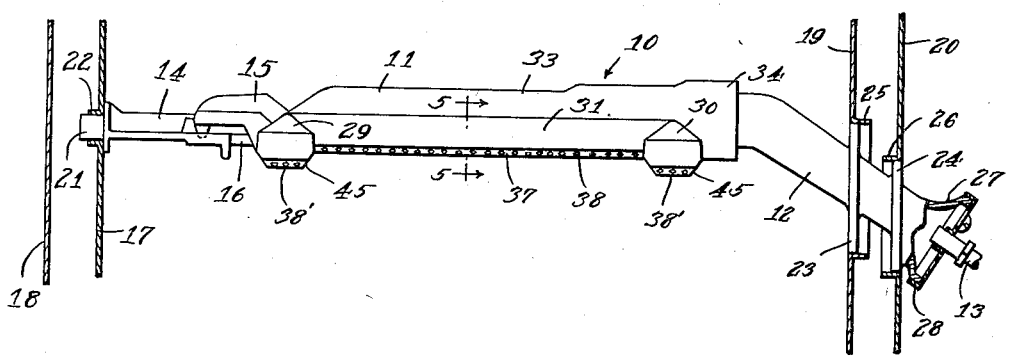
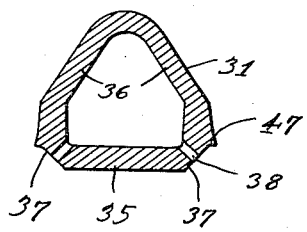

May 9, 1933.　　　P. I. HOLLMAN　　　1,908,668
OVEN BURNER
Filed Jan. 21, 1931　　　2 Sheets-Sheet 2
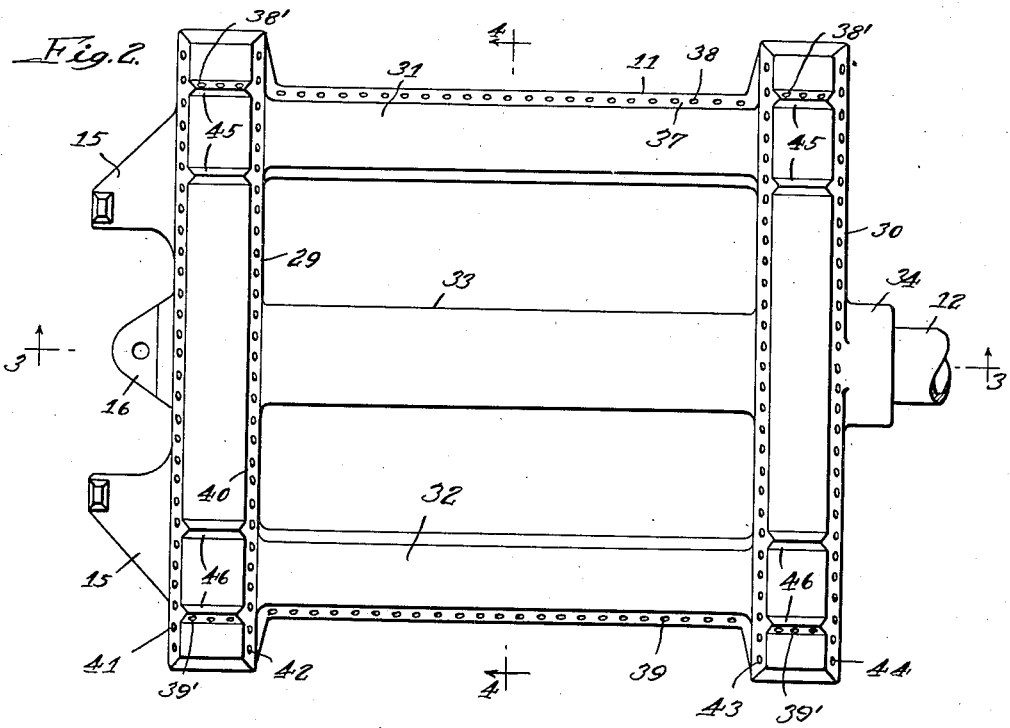
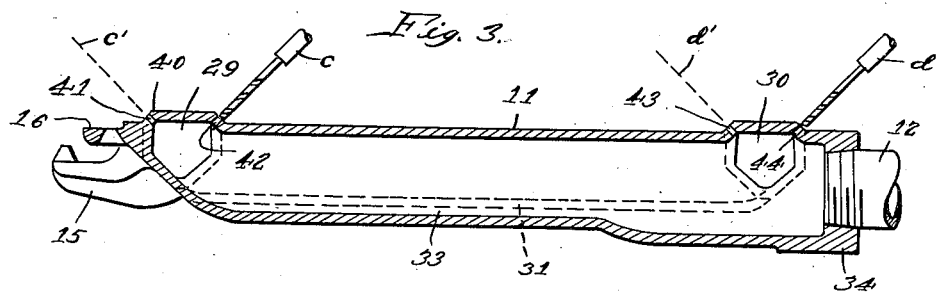
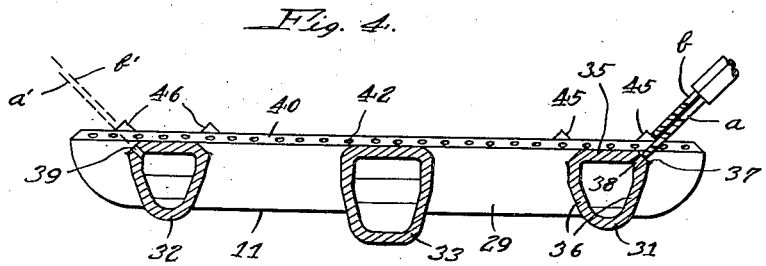

Patented May 9, 1933

1,908,668

UNITED STATES PATENT OFFICE

PETER I. HOLLMAN, OF ROCKFORD, ILLINOIS, ASSIGNOR TO GEO. D. ROPER CORPORATION, OF ROCKFORD, ILLINOIS, A CORPORATION OF ILLINOIS

OVEN BURNER

Application filed January 21, 1931. Serial No. 510,073.

This invention relates to an improved oven burner for gas ranges.

The principal object of my invention is to provide an oven burner designed both with a view to good performance, that is, from the standpoint of good flame propagation and even distribution, and, consequently, even heating, and with a view to facilitating production, so far as the drilling of the ports is concerned.

Another object is to provide a burner, the headers and connecting conduits of which are triangular in cross-section, the base portion of the triangle forming the flat bottom of the burner when the same is in the normal inverted position, that is, with the flame directed downwardly therefrom. The ports are located along the edges of the headers and conduits and outwardly directed so that there is very little tendency to heat the burner itself, especially in view of the fact that the side walls of all portions of the burner instead of overhanging the ports are inclined inwardly, converging upwardly. Less heating of the burner means less corrosion and closing of the ports, and also means less back pressure in the burner and, consequently, less chance for gas leakage at the mixer inlet.

Still another object is to provide an oven burner having a mixing tube in the form of a gooseneck downwardly inclined with respect to the plane of the burner for better injection of gas and air. The gas naturally rises and thus goes up into the burner, and air is entrained with it. It being difficult for the gas to have down-grade flow, it is obvious that there is little danger of gas leakage at the inlet, even at low pressures, such as are available with an oven heat regulator.

The invention is illustrated in the accompanying drawings, in which—

Figure 1 is a fragmentary vertical section through the oven of a gas range showing the oven burner of my invention in front elevation;

Fig. 2 is a view of the bottom of the burner removed from the oven with a portion of the mixing tube broken away;

Figs. 3 and 4 are vertical sections on the lines 3—3 and 4—4 of Fig. 2 looking in the direction indicated by the arrows, and Fig. 5 is an enlarged sectional detail on the line 5—5 of Figure 1.

Referring to Figure 1, the numeral 10 designates the oven burner of my invention which comprises a cast body 11 constituting the burner proper, and a mixing tube 12 suitably attached thereto and extending therefrom out of the oven for communication with the usual gas supply nipple 13. The present invention is not concerned with the burner support, so that is should suffice merely to state that a bracket 14 cooperates with two spaced lugs 15 suitably cast integral with the burner body 11 and an intermediate lug 16, for support of the burner in a horizontal plane, in the normal inverted position, that is, with the flame directed downwardly therefrom. Reference may be had to my copending application, Serial No. 510,074 filed January 21, 1931 for the specific details of the burner support. The walls shown at 17 and 18 are the inner and outer walls of one side of the oven, and those at 19 and 20 form the other side wall of the oven. The bracket 14 supports the one end of the burner from the wall 17 by means of a pair of laterally spaced studs 21 entered in holes 22 provided in the walls 17, and the mixing tube 12 has spaced circular flanges 23 and 24 suitably cast integral therewith to fit in holes 25 and 26 provided in the walls 19 and 20, respectively, so as to provide a third point of support for the burner at the opposite end thereof.

Attention may be called at this point to the fact that the mixing tube 12 is in the form of a gooseneck downwardly inclined with reference to the plane of the burner at an angle of approximately 30°, more or less. The flared inlet end 27 of the tube, on which the usual adjustable shutter 28 is provided, is coaxial with the tube, and the nipple 13 is inclined upwardly so as to fit in the center hole of the shutter. This arrangement makes for better injection of gas and air because the gas naturally rises and, therefore, goes up into the burner, and air is entrained with it. There is no likelihood of back flow because that could occur only by the gas flowing down grade. Consequently, there is little or no danger of gas leakage at the mixer inlet even at low pressures, such as prevail where oven heat regulators are provided.

The burner proper, as stated before, comprises a cast body 11, and referring now to Figs. 2–4, it will be observed that the body is of rectangular form providing two hollow conduits or headers 29 and 30 forming the ends of the burner, and three parallel, hollow, connecting conduits 31, 32 and 33 in right angle relation to said headers. The conduit 33 is the middle, and is preferably slightly larger in cross-section than the other two conduits 31 and 32, and serves mainly to establish good communication between the headers 29 and 30. A hollow boss 34 projecting from the header 30 provides a place for connecting the mixing tube 12 with the burner, and this boss constitutes a direct extension of the conduit 33, so that gas is delivered to the opposite ends of the burner in the headers 29 and 30 under substantially the same pressure. As will soon appear, the headers are both ported, and so are the connecting conduits 31 and 32, so that in operation flame is directed downwardly from the burner substantially in the form of a rectangle. This arrangement I have found to be preferable to others because it gives substantially uniform heating. Most other arrangements tend toward excessive heating centrally of the burner. Naturally, too, there is more apt to be uniform heating if all portions of the burner have unrestricted communication with the mixing tube; that is to say, if there is uniform distribution of the gas supplied to the burner. In this case, since the conduit 33 is provided simply for the purposes of communication, the gas entering the burner through the box 34 finds its way substantially with equal facility into both headers 29 and 30 and flows from these headers into the opposite ends of the connecting conduits 31 and 32 under the same pressure.

The headers 29 and 30, as well as the connecting conduits 31 and 32, are substantially triangular in cross-section, as appears in Figs. 3 and 4, and more particularly in Fig. 5. The bottom wall 35, speaking with reference to the normal inverted position of the burner as it is shown in Figs. 1 and 5, forms the base of the triangle, and the top walls 36, which are inclined inwardly and converge upwardly, form the sides of the triangle. The opposite longitudinal edges of the bottom 35 are beveled off, as appears at 37, thereby providing flat surfaces into which drills may be started easily in the drilling of ports, such as the port 38 shown in Fig. 5. Ports could, of course, be drilled along both edges of the bottom 35, but it will be seen by reference to Figs. 2 and 4 that I prefer to have one series of ports 38 along the outer edge of the bottom of the conduit 31 and a similar series of ports 39 along the outer edge of the conduit 32, the ports in each series being close enough to one another so that there is good flame propagation from one end of a series to the other. The bottoms of the conduits 31 and 32 are in a common plane, but the bottoms of the headers 29 and 30 are in another plane slightly below, as can be seen to best advantage in Figure 1. The longitudinal edges of the headers 29 and 30 are also beveled, as indicated at 40. Two series of ports 41 and 42 are drilled into these edges of the header 29. In like manner, two other series of ports 43 and 44 are drilled into the edges of the header 30. The ports 38, 39, and 41–44 are all directed downwardly at an acute angle with reference to the bottoms of the different portions of the burner in which these ports occur, and in each case are directed outwardly with respect to the edge of the burner into which they are drilled. The ports 41 and 42 are, therefore, in downwardly divergent relation to one another and so are the ports 43 and 44. Now, as shown in Fig. 2, two spaced ribs or bosses 45 are cast integral with the bottom of the headers 29 and 30 approximately in line with the edges of the conduit 31. The ribs are suitably V-shaped in cross-section so as to present inclined side faces substantially in parallelism with the beveled edges 37 of the conduit 31. Two series of ports 38', one series at each end of the conduit 31, are drilled through these ribs into the headers at the same time that the ports 38 are drilled, in a multiple spindle drilling machine. In Fig. 4 the way in which that is done is indicated. One of the drills for the drilling of the holes 38 is indicated at $a$ and one of those for the drilling of the holes 38' is indicated at $b$. In a similar manner, ribs or bosses 46 are provided on the headers 29 and 30 in line with the edges of the conduit 32 and two series of ports 39', one series at each end of the conduit 32, are drilled into these ribs at the same time that the ports 39 are drilled. In Fig. 4, the dotted lines at $a'$ and $b'$ indicate the center lines of drills for the drilling of the ports 39 and 39', respectively. The beveling of the edges of the headers 29 and 30 makes the one beveled edge of header 29 parallel with the one beveled edge of header 30 so that drills, as indicated at $c$ and $d$ in Fig. 3, are arranged to be used in one operation or set-up to drill the ports 42 and 44, and in like manner, drills are arranged to be used in one operation or set-up to drill the ports 41 and 43, as indicated by the center lines $c'$ and $d'$. It is, therefore, apparent from a study of Figs. 2–4, and particularly Figs. 3 and 4, that four drilling operations will take care of the drilling of all of the ports. In each drilling operation, as many drills are used in a row as possible, there being, of course, a limitation as to how close they can be spaced. Then, it is simply a matter of indexing the work one or two times after one set of ports in a series has been drilled to produce all of the ports of the series. Furthermore, the square design of the burner with series of ports crossing one another leaves no turns or corners where separate ports have to be drilled so as to connect up different series. Then, too, the difference in the level of the headers with respect to the connecting conduits permits the drilling of the series of ports 42 and 43 continuously from end to end, each series in one operation, the series 42 with the series 44 in one set-up, and the series 43 with the series 41 in another set-up. No gaps are left at the junctions between the connecting conduits and headers where separate sets of ports to bridge the gaps would otherwise have to be drilled.

In operation, the burner is lit at one point, as by means of a pilot light, where the oven is equipped with an oven heat regulator, and the flame is propagated from port to port in a series and from one series to the ports of another series crossing the first series. Thus, assuming that the burner is ignited at one of the ports 44, the flame is propagated quickly the full length of that series and results in ignition of gas issuing from ports 38' and 39'. That in turn results in the ignition of gas issuing from ports 43, and from that point the flame is propagated to ports 38 and 39 and from there to the series of ports 42. The propagation from ports 42 to ports 38' and 39' and thence to ports 41 follows naturally. The ribs 45 and 46 form channels on the bottom of the headers 29 and 30 in which, if there is any delay in the propagation of flame from the ports 44 to the ports 38' and 39' or from the ports 42 to the ports 38' and 39', the gas is arranged to collect until there is seepage of gas from the ends of these channels enough to cause lighting across from one series to the other. The ports 42 and 43 are in transverse relation to the ports 38 and 39 so that when the gas issuing from the ports of one series is ignited, it is certain to cause the ignition of the gas issuing from the ports of the adjacent series. If desired, the beveled edges of the various portions of the burner in which the ports are drilled, as described above, may be formed with shoulders such as I have indicated at 47 in Fig. 5, so as to form channels lengthwise of the edges of the headers and connecting conduits for the gas to collect or be confined, more or less, to insure easier propagation of flame along the series of ports and at the same time deflect the flame outwardly away from the top walls of the burner to minimize heating thereof. That, however, has not been found to be necessary with the present advantageous construction.

The triangular cross-section of the various portions of the burner in which the ports are provided, along the edges of the base of the triangle, as above described, is found to be highly advantageous because there is less tendency to heat the burner, owing to the fact that the top walls of the various portions of the burner do not overhang the ports and are, therefore, more or less out of the heating zone. This less heating of the burner means less corrosion and, consequently, less danger of ports being closed. Furthermore, less heating of the burner means less back pressure in the burner, and, consequently, less chance for gas leakage at the mixer inlet. The advantage of a cooler burner can best be appreciated when it is considered that excessive heating of the burner results in expansion of the gases therein, which in turn prevents proper air injection. That in turn causes a "soft" flame, as distinguished from the good Bunsen flame. A soft flame, as is well known to those skilled in this art, has a direct upward trend, and, consequently, will hug the side of the burner and aggravate the trouble. The burner is, therefore, heated excessively, and that means more oxidation and, consequently, clogged ports. These difficulties are eliminated with the present construction.

It is believed the foregoing description conveys a good understanding of my invention. The appended claims have been drawn so as to cover all legitimate modifications and adaptations.

I claim:

1. An oven burner for a gas range comprising a hollow body portion arranged to be disposed in a horizontal plane at a predetermined elevation, the said body portion having ports in the bottom wall thereof, and an elongated mixing tube communicating with the side of said body portion and extending downwardly at an acute angle with respect to the plane thereof, said tube having the inlet end thereof enlarged to form a mixer concentric with the rest of the tube, there being a shutter on said mixer arranged to receive an upwardly inclined gas supply nipple for the delivery of gas upwardly through the mixing tube into the body portion.

2. In a gas burner, a conduit having a substantially horizontal bottom wall, the one longitudinal edge of said bottom wall being upwardly and outwardly beveled, and an inwardly and upwardly inclined top wall extending upwardly from the bottom wall along the top of the beveled edge, the beveled edge of the conduit having ports along said beveled edge communicating with the inside of the conduit, and an outwardly projecting substantially horizontal shoulder defining the top of the beveled edge and providing a gas collecting channel over the ports for good flame propagation and also for deflecting the flame outwardly away from the top wall.

3. In a gas burner, a conduit having a substantially horizontal bottom wall, the opposed longitudinal edges of said bottom wall being upwardly and outwardly beveled, inwardly inclined, upwardly converging top walls extending upwardly from the bottom wall along the tops of the beveled edges, the beveled edges having ports respectively in downwardly diverging relation to one another and communicating with the inside of the conduit, whereby the flames from said ports are projected from the conduit with minimum heating of the top walls, and outwardly projecting substantially horizontal shoulders defining the top of the beveled edges and providing gas collecting channels over the ports for good flame propagation and for deflecting the flame outwardly away from the top walls.

4. A gas burner comprising transverse and longitudinal gas conduits in communication with one another, ports provided in rows extending lengthwise of the transverse conduits and lengthwise of the longitudinal conduits, there being two rows along the opposite edges of the bottom wall of at least one of the transverse conduits, the inner row being in flame propagating relation to the rows on the longitudinal conduits, and one or more gas conveying channels across the bottom of said transverse conduit placing the two rows of ports on said conduit in flame propagating relation to one another.

5. A burner as set forth in claim 4 including a row of ports provided in the bottom of the transverse conduit lengthwise of the gas-conveying channel.

6. A gas burner comprising transverse and longitudinal gas conduits in communication with one another, gas discharge ports along the edges of the conduits, three transverse conduits having the bottoms thereof in a lower plane than the bottoms of the longitudinal conduits whereby the ports along the edges of the transverse conduits are in flame propagating relation to the ports along the edges of the longitudinal conduits, downwardly projecting bosses provided on the transverse conduits extending crosswise of the bottoms thereof in line with the edges of the longitudinal conduits, the said bosses forming gas-conveying channels crosswise of the bottoms of the transverse conduits and gas discharge ports provided in said bosses in communication with the channels.

7. A gas burner comprising transverse and longitudinal gas conduits in communication with one another, the longitudinal conduits having beveled longitudinal edges at the bottom thereof, downwardly and outwardly directed gas discharge ports provided in said longitudinal conduits along said beveled edges, gas discharge ports provided along the edges of the transverse conduits in flame propagating relation to the other ports, bosses projecting downwardly from the bottoms of the transverse conduits crosswise of the latter and approximately in line with the beveled edges of the longitudinal conduits, the sides of said bosses being beveled substantially parallel with the beveled edges, and downwardly directed gas discharge ports in the sides of said bosses substantially parallel with the ports in the beveled edges of the longitudinal conduits, the said bosses providing gas-conveying channels crosswise of the bottoms of the transverse conduits to place the ports along the edges of the transverse conduits in flame propagating relation.

8. A gas burner comprising a pair of transverse gas conduits, a pair of longitudinal conduits having their ends closed and connected by the transverse conduits, gas discharge ports along the edges of the transverse and longitudinal conduits in flame propagating relation to one another, and another longitudinal conduit midway between the other longitudinal conduits, the same being devoid of ports and provided solely to establish communication between mid points of the transverse conduits whereby to substantially equalize pressure therebetween.

9. A gas burner comprising a pair of transverse gas conduits, a pair of longitudinal conduits having their ends closed and connected by the transverse conduits, gas discharge ports along the edges of the transverse and longitudinal conduits in flame propagating relation to one another, and a longitudinal conduit devoid of ports and affording a larger passage therethrough for gas to flow from the one transverse conduit to the other than is provided in the other longitudinal conduits, said conduit communicating with the transverse conduits approximately midway between the other longitudinal conduits, whereby to substantially equalize pressure therebetween.

10. An oven burner for a gas range comprising a hollow body portion arranged to be disposed in a horizontal plane at a predetermined elevation, the said body portion having ports in the bottom wall thereof, and an elongated mixing tube communicating with the side of said body portion and extending downwardly at an acute angle with respect to the plane thereof, said tube having the inlet end thereof enlarged to form a mixer, there being a shutter on said mixed arranged to receive a gas supply nipple for the delivery of gas through the mixing tube into the body portion.

11. A gas burner comprising transverse and longitudinal gas conduits in communication with one another, gas discharge ports along the edges of the conduits, the transverse conduits having the bottoms thereof in a lower plane than the bottoms of the longitudinal conduits whereby the ports along the edges of the transverse conduits are in flame propagating relation to the ports along the edges of the longitudinal conduits, downwardly projecting bosses provided on the transverse conduits extending crosswise of the bottoms thereof from one edge to the other, said bosses forming gas conveying channels across the bottom of the transverse conduit for the propagation of flame from a row of ports provided along one edge of the bottom wall of the conduit to a row of ports provided along the other edge of the bottom wall of said conduit.

12. A gas burner comprising transverse and longitudinal gas conduits in communication with one another, ports provided in rows extended lengthwise of the transverse conduits and lengthwise of the longitudinal conduits, whereby to permit of flame propagation between the transverse and longitudinal conduits, downwardly projecting bosses provided on at least one of the transverse conduits extending crosswise of the bottom thereof in alignment with the edges of the longitudinal conduits, whereby to permit making rows of ports in said bosses in the same drilling operation with the rows of ports on the longitudinal conduits, the said bosses forming gas conveying channels crosswise of the bottom of the transverse conduit for flame propagation from a row of ports provided along one edge of said conduit to a row of ports provided along the other edge.

13. A gas burner comprising transverse and longitudinal gas conduits in communication with one another, the longitudinal conduits having beveled longitudinal edges at the bottom thereof, and downwardly and outwardly directed gas discharge ports provided in said longitudinal conduits along said beveled edges, the transverse conduits having the bottoms thereof in a lower plane than the bottoms of the longitudinal conduits and also having the edges thereof beveled, and downwardly and outwardly directed gas discharge ports provided in said transverse conduits along said beveled edges in flame propagating relation to the first-mentioned ports, bosses projecting downwardly from the bottom of at least one of said transverse conduits crosswise of the latter and approximately in line with the beveled edges of the longitudinal conduits, the sides of said bosses being beveled substantially parallel with the beveled edges of the longitudinal conduits and having downwardly and outwardly directed gas discharge ports provided therein substantially parallel with the ports in the beveled edges of the longitudinal conduits, the said bosses providing gas conveying channels crosswise of the bottom of the transverse conduit to place the ports along the edges of said conduit in flame propagating relation.

In witness of the foregoing I affix my signature.

PETER I. HOLLMAN.

CERTIFICATE OF CORRECTION.

Patent No. 1,908,668.  May 9, 1933.

PETER I. HOLLMAN.

It is hereby certified that error appears in the printed specification of the above numbered patent requiring correction as follows: Page 4, line 40, claim 6, for "three" read "the"; and line 118, claim 10, for "mixed" read "mixer"; and that the said Letters Patent should be read with these corrections therein that the same may conform to the record of the case in the Patent Office.

Signed and sealed this 25th day of July, A. D. 1933.

M. J. Moore.

(Seal)   Acting Commissioner of Patents.